United States Patent [19]

Wipasuramonton et al.

[11] Patent Number: 5,615,909
[45] Date of Patent: Apr. 1, 1997

[54] VEHICLE SAFETY APPARATUS

[75] Inventors: Pongdet P. Wipasuramonton, Rochester; Louis R. Brown, Oxford, both of Mich.

[73] Assignee: TRW Vehicle Safety Systems Inc., Lyndhurst, Ohio

[21] Appl. No.: 580,439

[22] Filed: Dec. 27, 1995

[51] Int. Cl.$^6$ .................................................. B60R 21/22
[52] U.S. Cl. .................................................. 280/730.2
[58] Field of Search .............................. 280/730.1, 730.2

[56] References Cited

U.S. PATENT DOCUMENTS

| | | | |
|---|---|---|---|
| 4,946,191 | 8/1990 | Putsch | 280/730.2 |
| 5,112,079 | 5/1992 | Haland et al. | 280/730.2 |
| 5,496,061 | 3/1996 | Brown | 280/730.2 |
| 5,499,840 | 3/1996 | Nakano | 280/730.1 |

FOREIGN PATENT DOCUMENTS

0611684  8/1994  European Pat. Off. .

Primary Examiner—Kenneth R. Rice
Attorney, Agent, or Firm—Tarolli, Sundheim, Covell, Tummino & Szabo

[57] ABSTRACT

An air bag module (80) mounted on a vehicle seatback (22) includes an air bag (90) which has a narrow elongate neck portion (130) and a wide body portion (140). The neck portion (130) and the body portion (140) when inflated lie adjacent to the head and neck of an occupant (52) of the seat (12). A lower portion (220) of the air bag (90) is folded and packed more tightly than an upper portion (222), so that the upper portion deploys more quickly to control the direction of inflation of the air bag. The air bag (90) deploys at an angle of 65° upward from the horizontal and at an angle of 3° outward of a front-to-back axis (36).

17 Claims, 5 Drawing Sheets

VEHICLE SAFETY APPARATUS

BACKGROUND OF THE INVENTION

1. Technical Field

The present invention relates to a vehicle safety apparatus and particularly relates to an air bag module including an inflatable vehicle occupant protection device, such as an air bag, for helping to protect a vehicle occupant in the event of a side impact to the vehicle.

2. Description of the Prior Art

It is known to inflate an air bag to help protect a vehicle occupant in the event of a side impact to a vehicle of a magnitude above a predetermined threshold. The air bag is stored in a deflated condition, together with an inflator, in the vehicle seat in which the occupant is seated. In the event of a side impact to the vehicle of a magnitude above the predetermined threshold, the inflator is actuated and the air bag is inflated into a position between the vehicle occupant and the adjacent vehicle door. The air bag can help protect the vehicle occupant from forcefully being struck by parts of the vehicle such as the door. The air bag can also help protect the vehicle occupant from objects which might intrude through the door or a side window of the vehicle, such as a pole or a tree, during the side impact.

SUMMARY OF THE INVENTION

The present invention is a vehicle safety apparatus comprising a seat for supporting an occupant of the vehicle in a seated position with the occupant's head disposed adjacent to a side structure of the vehicle. The seat includes a seat bottom portion and a seatback. An inflatable vehicle occupant protection device is located in a housing for, when inflated, helping to protect the occupant of the vehicle. The inflatable device has a body portion and an elongate tubular neck portion which lie adjacent to the occupant's head and neck when inflated for engagement by the occupant's head and neck. The apparatus also includes an inflator for directing inflation fluid into the inflatable device to inflate the inflatable device. The apparatus further includes means for sensing a side impact to the vehicle of a magnitude sufficient to require inflation of the inflatable device and for actuating the inflator to inflate the inflatable device in response to sensing the side impact to the vehicle. Support means supports the housing on the seatback for inflation of the inflatable device above the vehicle occupant's shoulder and between the vehicle occupant's head and the vehicle side structure. The neck portion of the inflatable device when inflated extends from the housing and has a first axis that extends through the neck portion. The body portion of the inflatable device when inflated extends from the neck portion and has a second axis extending through the body portion at an angle to the first axis. The axis of the neck portion of the inflatable device extends forward at an angle of about 65° above the horizontal and at an angle of about 3° outward from a front-to-back axis of the vehicle when the inflatable device is inflated and the seatback is reclined at an angle of about 25° from the vertical.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

The present invention relates to a vehicle safety apparatus and particularly relates to an air bag module including an inflatable vehicle occupant protection device, such as an air bag, for helping to protect a vehicle occupant in the event of a side impact to the vehicle of a magnitude sufficient to require inflation of the inflatable device to help protect or help restrain the vehicle occupant. The present invention is applicable to various vehicle safety apparatus constructions. As representative of the present invention, FIGS. 1–4 illustrate a vehicle safety apparatus 10.

Figure 1:
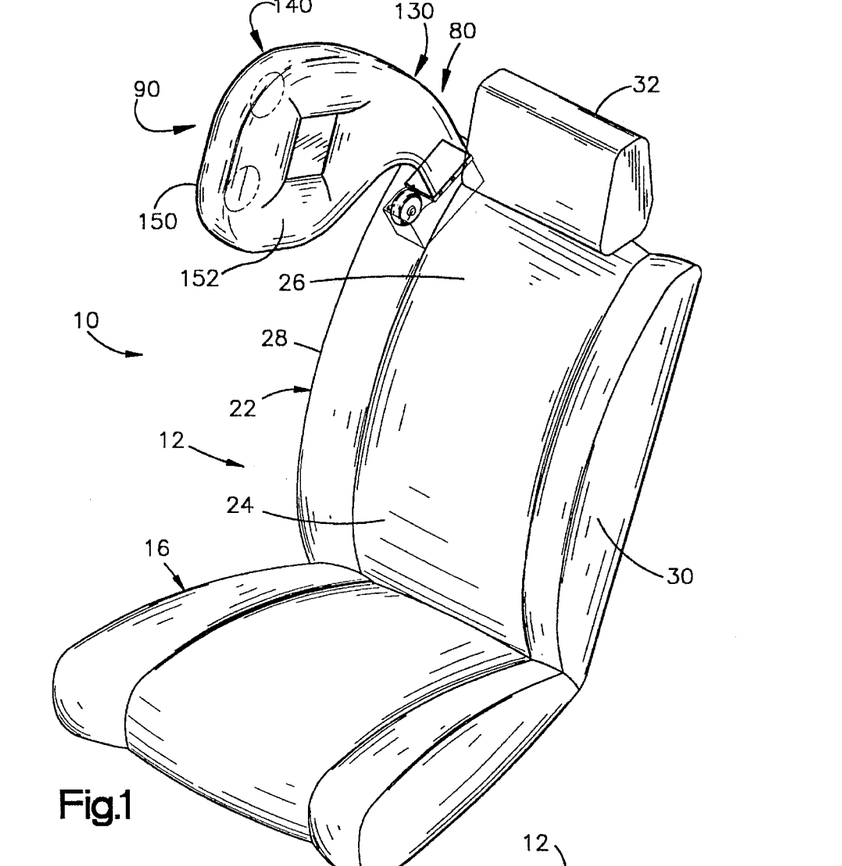
FIG. 1 is a perspective view of a vehicle seat and an air bag module constructed in accordance with the present invention, showing the air bag in an inflated condition.
Figure 2:
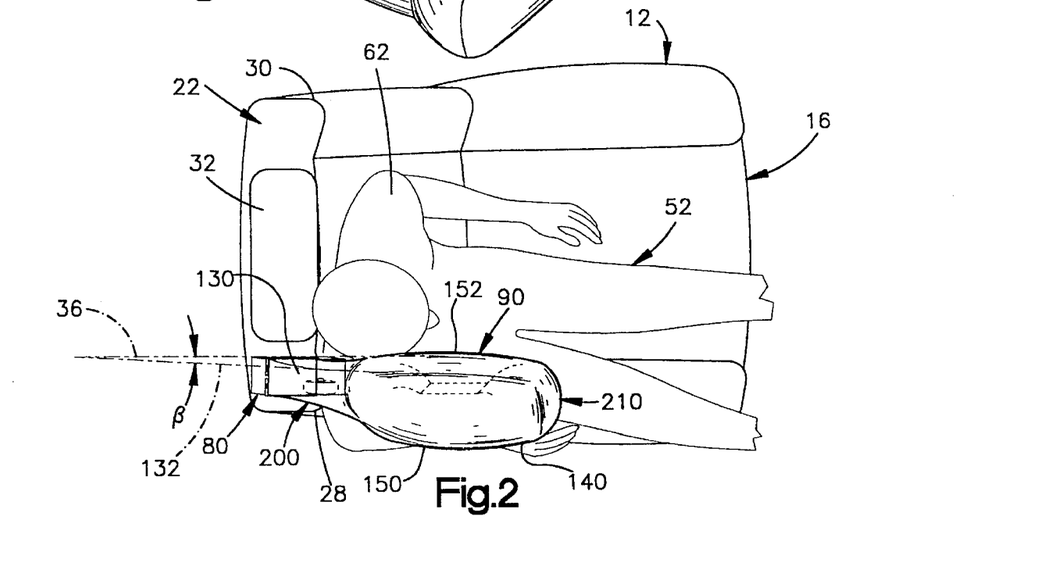
FIG. 2 is a schematic top plan view of the vehicle seat and air bag module of FIG. 1 showing the air bag in an inflated condition adjacent to a vehicle occupant.
Figure 3:
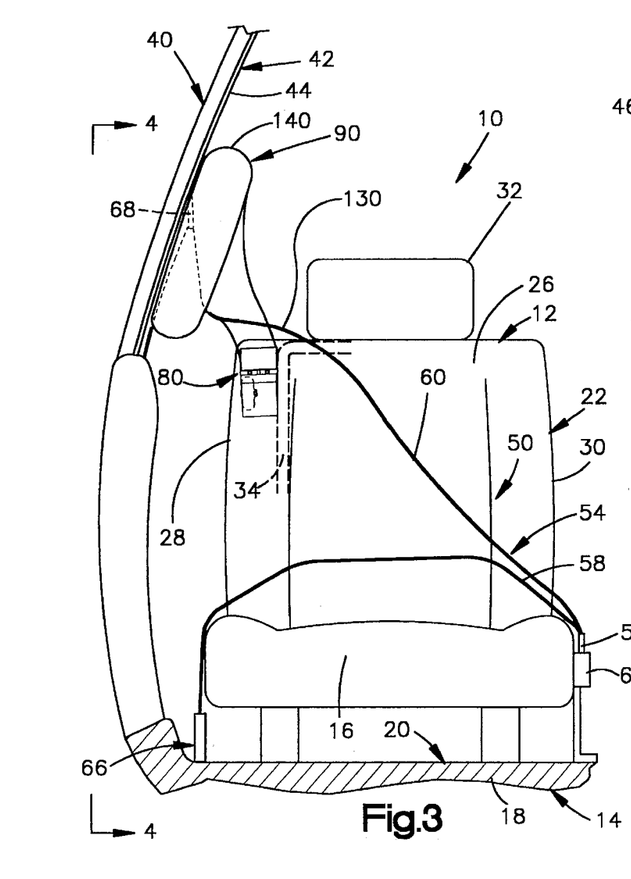
FIG. 3 is a schematic front view of the vehicle seat and air bag module of FIG. 1 showing the air bag in an inflated condition between a vehicle occupant and a vehicle door.

The vehicle safety apparatus 10 includes a seat 12 which is illustrated as a front passenger seat for an occupant 52 (FIG. 2) of a vehicle 14 (FIGS. 3 and 4). The seat 12 includes a seat bottom cushion 16 supported on a portion 18 (FIG. 3) of the body 20 of the vehicle 14. The seat 12 includes a seatback 22 connected with the seat bottom cushion 16. The seatback 22 has a lower portion 24 and an upper portion 26. The seatback 22 also has an outboard side 28 and an inboard side 30.

The seatback 22 includes a headrest 32, which is supported on or which may be formed as one piece with the upper portion 26 of the seatback. A seat frame member 34 (FIGS. 3 and 4) is disposed in the seatback 22. A front-to-back axis 36 (FIG. 2) extends through the seat 12 in a direction parallel to the direction of travel of the vehicle.

The vehicle body 20 includes a door 40 (FIG. 3) disposed adjacent to the seat 12. The door 40 includes a window 42 having an inner major side surface 44. A B-pillar 46 of the vehicle 14 is disposed behind (to the left of, as viewed in FIG. 4) the door 40. It should be understood that the present invention is usable in a vehicle such as a van which has no side window adjacent to the seat 12 to help protect the vehicle occupant from contact with the side structure of the vehicle.

The vehicle 14 includes a three-point continuous loop seat belt system 50 (FIGS. 3 and 4) for restraining an occupant 52 of the seat 12. The seat belt system 50 is shown in FIGS.

Figure 4:
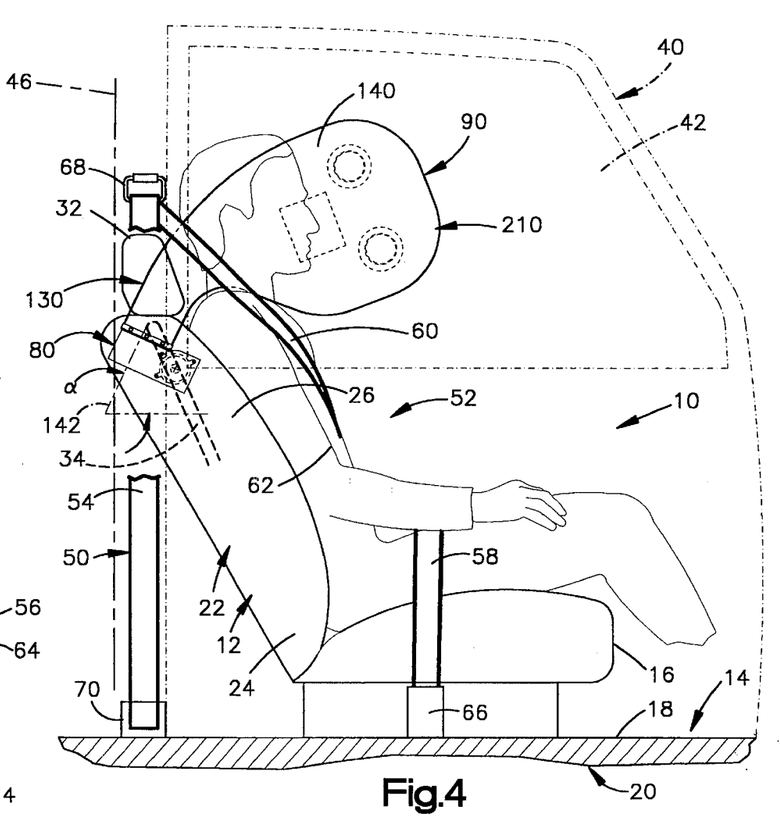
FIG. 4 is a schematic illustration taken generally along line 4—4 of FIG. 3.

3 and 4 in an engaged condition. The seat belt system 50 includes a single continuous length of belt webbing 54 which is divided by a movable tongue assembly 56 into a lap portion 58 and a shoulder portion 60. The lap portion 58 of the belt webbing 54 extends across the seat bottom cushion 16 and across the lap of the occupant 52. The shoulder portion 60 of the belt webbing 54 extends across the seatback 22 and across the upper torso 62 of the occupant 52 of the seat 12. The tongue assembly 56 is engaged with a buckle 64 anchored to the vehicle body 20.

One end of the length of belt webbing 54 is connected at an anchor point 66 to the vehicle body 20. From the anchor point 66, the belt webbing 54 extends across the seat bottom cushion 16 to the tongue assembly 56 and the buckle 64. The belt webbing 54 then extends from the tongue assembly 56 across the torso 62 of the vehicle occupant 52 to a D-ring 68 supported on the vehicle B-pillar 46. The belt webbing 54 extends downward from the D-ring 68 to a seat belt webbing retractor 70 which is supported in a known manner on the vehicle body 20.

The vehicle safety apparatus 10 includes an air bag module 80 which is mounted on the vehicle seat 12. The air bag module 80 includes a housing 82 (FIG. 5), an inflator 84, and a retainer or retaining ring 86. The air bag module 80 also includes a particular type of inflatable device 90 which is commonly known as an air bag.

The housing 82 (FIG. 5) is made from sheet metal and has a box-shaped configuration which defines a chamber 98 in the housing. The housing 82 has an upper portion 100 for storing the air bag 90 in a folded condition (for clarity, the folded portions of the air bag 90 are not shown in FIG. 5). The upper portion 100 of the housing 82 includes a back wall 101. A forward edge portion 102 of the housing 82 defines a generally rectangular deployment opening 103 in the housing 82 opposite the back wall 101. A lower portion 104 of the housing 82 receives the inflator 84.

The inflator 84 is illustrated as a pyrotechnic inflator which uses the combustion of gas-generating material to generate inflation fluid in the form of gas to inflate the air bag 90. The module 80 alternatively could include an inflator which contains a stored quantity of pressurized inflation fluid, or a combination of pressurized inflation fluid and ignitable material for heating the inflation fluid. As illustrated with the reference numeral 112 in dot-dash lines in FIG. 5, an inflator could extend through both the lower portion 104 and the upper portion 100 of the housing 82.

An inflator mounting ring 114 together with a plurality of fasteners 116 secures the inflator 84 in the lower portion 104 of the housing 82. The vehicle safety apparatus 10 includes known means indicated schematically at 118 (FIG. 5) for sensing a side impact to the vehicle 14 and for actuating the inflator 84 in response to the sensing of a side impact. The means 118 may include a side impact sensor and vehicle circuitry for electrically actuating the inflator 84 in response to sensing a side impact to the vehicle 14 greater than a predetermined threshold value. The inflator 84 has one or more fluid outlets (not shown) disposed inside the housing 82 for directing inflation fluid into the chamber 98 in the housing upon actuation of the inflator to inflate the air bag 90.

The retaining ring 86 (FIGS. 7 and 8) is a ring-shaped member preferably made from sheet metal. The retaining ring 86 has a rectangular configuration which defines a central opening in the retaining ring. The rectangular central opening in the retaining ring 86 has the same configuration as the deployment opening 103 in the housing 82.

The air bag 90 (FIGS. 1 and 6), when in the inflated condition, has an elongate neck portion 130 and a body portion 140. A first axis 142 (FIG. 6) of the air bag 90 forms a central axis of the neck portion 130. The first axis 142 extends through the elongate neck portion 130 of the air bag 90. A second axis 144 of the air bag 90 forms a central axis of the body portion 140 of the air bag. The second axis 144 extends through the body portion 140 at an angle to the first axis 142 of the neck portion. The second axis 144 can extend at an angle of from about 30° to about 70° to the first axis 142. In the air bag 90 illustrated in the drawings, the second axis 144 extends at an angle of about 45° to the first axis 142.

Figure 6:
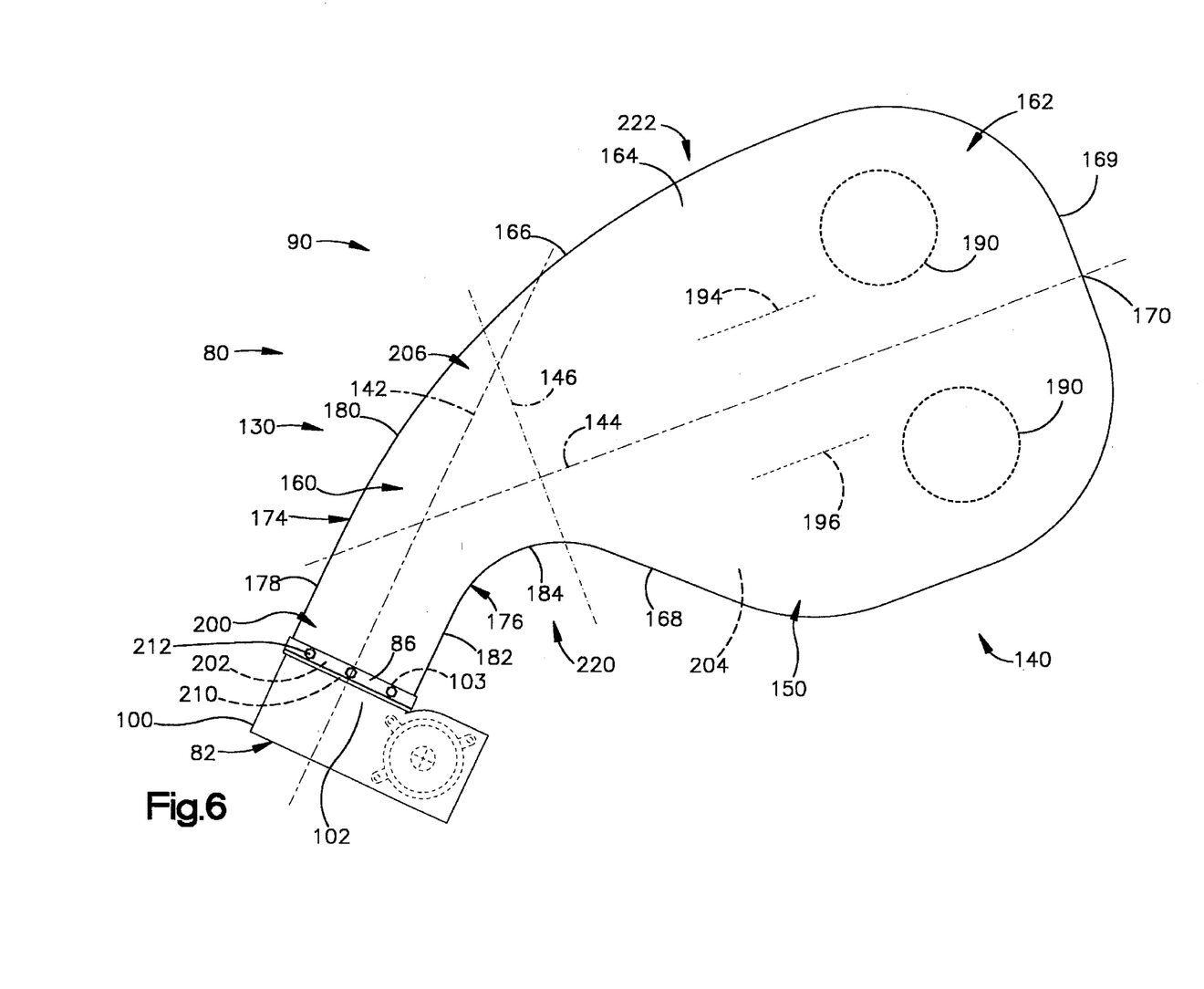
FIG. 6 is an elevational view of the air bag of FIG. 1 shown in an inflated condition.

For purposes of illustration, it can be considered that the dividing line between the elongate neck portion 130 and the body portion 140 of the air bag 90 is along an imaginary line 146 (FIG. 6). The imaginary line 146 extends generally perpendicular to the second axis 144 of the body portion 140 of the air bag 90. It should be understood that the neck portion 130 and the body portion 140 of the air bag 90 are not discrete parts of the air bag but rather are portions of the air bag which gradually merge into each other.

The air bag 90 has a lower portion 220 (FIG. 6). The lower portion 220 of the air bag 90 includes those portions of the air bag which are disposed below (as viewed in FIG. 6) the axes 142 and 144. The air bag 90 also has an upper portion 222. The upper portion 222 of the air bag 90 includes the portions of the air bag which are disposed above (as viewed in FIG. 6) the axes 142 and 144. The upper portion 222 of the air bag 90 is disposed farther from the shoulder of the occupant 52, when the air bag is inflated, than the lower portion 220 of the air bag.

The air bag 90 (FIG. 2) is formed from two separate fabric material panels, that is, an outer panel 150 and an inner panel 152. The panels 150 and 152 are sewn together to form the air bag 90 including the neck portion 130 and the body portion 140. The panels 150 and 152 are substantially identical to each other and therefore only the outer panel 150 will be described in detail.

The outer panel 150 is a single piece of fabric material, such as woven nylon, which has a configuration substantially identical to that of the inflated air bag 90, as best seen in FIG. 6. The outer panel 150 has an elongate neck portion 160 and an oblong body portion 162. The body portion 162 of the outer panel 150 has an outer peripheral portion 164. The outer peripheral portion 164 includes arcuate side portions 166 and 168 disposed adjacent to the neck portion 160 of the outer panel 150. An outer end portion 169 of the air bag 90 includes a terminal end 170 of the air bag disposed on the second axis 144.

The elongate neck portion 160 of the outer panel 150 is defined generally by first and second side portions 174 and 176. The first side portion 174 has a linear segment 178 adjacent to the housing 82. The first side portion 174 also includes an arcuate segment 180 which merges with the side portion 166 of the body portion 162 of the outer panel 150. The second side portion 176 has a linear segment 182 disposed adjacent to the housing 82. The second side portion 176 also has an arcuate segment 184 which merges with the side portion 168 of the body portion 162 of the outer panel 150. The radius of curvature of the arcuate segment 184 is smaller than the radius of curvature of the arcuate segment 180 of the side portion 174 of the neck portion 160.

A pair of vents illustrated schematically at 190 are disposed in the body portion 162 of the outer panel 150. The vents 190 are of a known construction suitable for venting inflation fluid from the air bag 90 after deployment. The inner panel 152 does not include vents such as the vents 190 in the outer panel 150. The inner panel 152 includes an elongate neck portion and a oblong body portion and otherwise has a configuration identical to that of the outer panel 150.

The air bag 90 is assembled in a known manner by stitching the outer panel 150 to the inner panel 152 around the outer periphery of the panels. Next, the air bag 90 is turned inside out by pulling the body portions of the panels 150 and 152 through the opening between the ends of the elongate neck portions of the panels. The seams of the air bag 90 are top-stitched in a known manner. A pair of tethers indicated schematically at 194 and 196 are sewn between and extend between the inner side surface of the outer panel 150 and the inner side surface of the inner panel 152.

The neck portion 160 of the outer panel 150 and the neck portion of the inner panel 152 together form the neck portion 130 of the air bag 90. A first end portion or mouth portion 200 of the neck portion 130 of the air bag 90 defines an inflation fluid opening 202 into the air bag 90. The mouth portion 200 of the air bag 90 is tubular in configuration and surrounds the inflation fluid opening 202.

The body portion 162 of the inner panel 150 and the body portion of the outer panel 152 together form the body portion 140 of the air bag 90. The body portion 140 defines an inflation fluid volume 204 of the air bag 90. A second end portion 206 of the neck portion 130 of the air bag 90 places the inflation fluid volume 204 in fluid communication with the inflation fluid opening 202. The neck portion 130 of the air bag 90 curves down and away from the body portion 140 of the air bag, when the air bag is in the inflated condition, thus giving the air bag an arcuate or comma-shaped configuration as seen in FIG. 6.

The neck portion 130 of the air bag 90, when inflated, has a relatively small height measured in a direction perpendicular to the first axis 142. The body portion 140 of the air bag 90, when inflated, has a relatively large height as measured in a direction perpendicular to the second axis 144. The body portion 140 of the air bag 90 may have a height which is in the range of from about twice the height of the neck portion 130 to about four times the height of the neck portion.

After the air bag 90 is sewn, a thin flexible welt 210 is placed around the mouth portion 200 of the air bag. The mouth portion 200 of the air bag 90 is then folded back over the welt 210 and sewn to itself to encircle the welt. In assembling the air bag 90 to the housing 82, the retaining ring 86 (FIGS. 5–7) is placed around the mouth portion 200 of the air bag. The mouth portion 200 extends through the central opening of the retaining ring 86. The retaining ring 86 and the mouth portion 200 of the air bag 90 are fixed to the forward edge portion 102 of the upper portion 100 of the housing 82 by a plurality of fasteners 212.

Figures 5, 7, 8, 9:
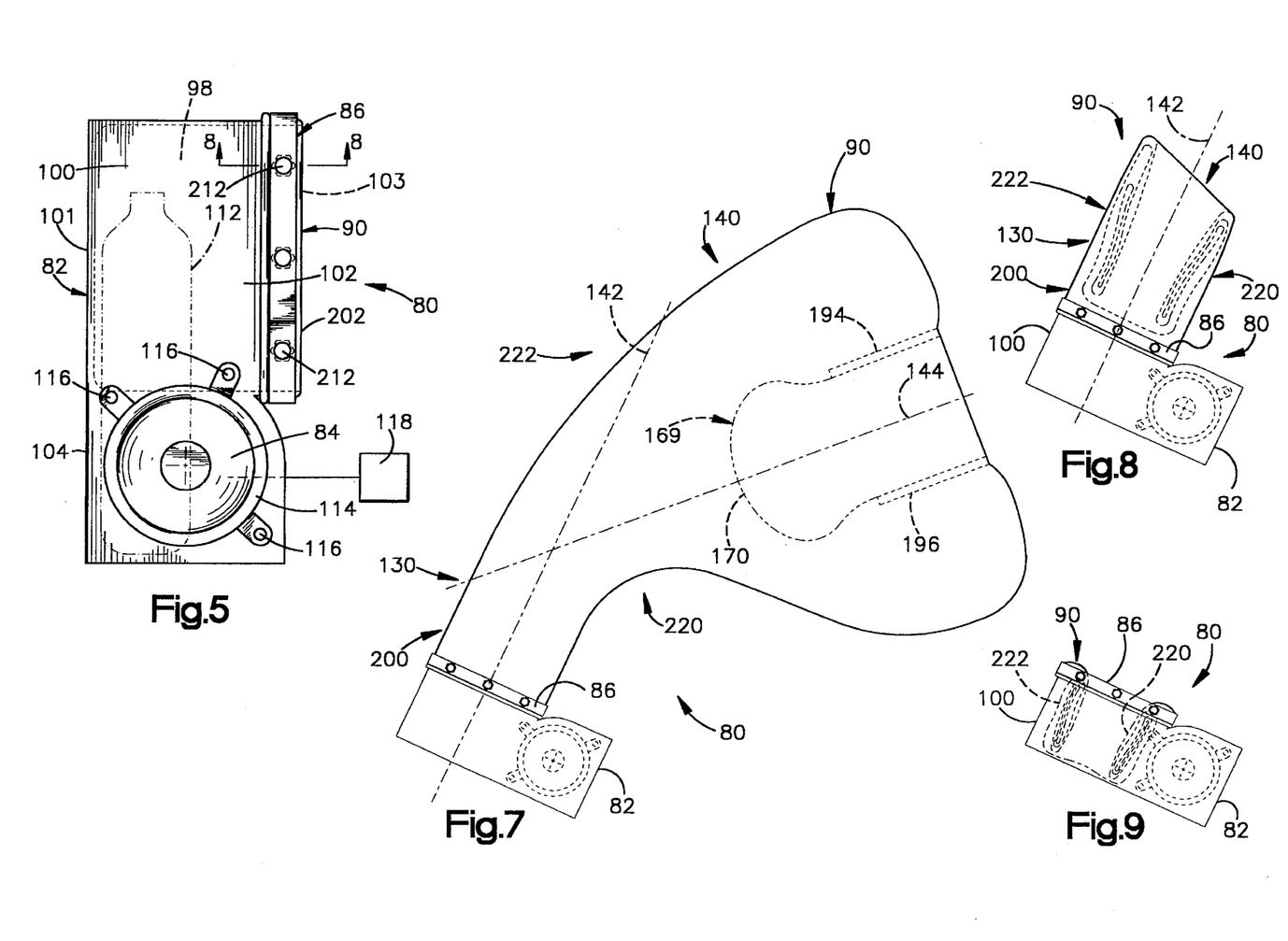
FIG. 5 is an enlarged side elevational view of the air bag module of FIG. 1.
FIG. 7 is a schematic view illustrating a first stage in the folding of the air bag of FIG. 6.
FIG. 8 is a view similar to FIG. 7 illustrating a second stage in the folding of the air bag.
FIG. 9 is a view similar to FIG. 8 illustrating a third stage in the folding of the air bag.

The air bag 90 is then folded inside the upper portion 100 of the housing 82 in a manner shown schematically in FIGS. 7–9. In the first step of the folding process, the outer end portion 169 of the air bag 90, including the terminal end 170, is tuck folded inside the body portion 140 of the air bag, to a condition as shown schematically in FIG. 7. Specifically, the outer end portion 169 of the air bag 90 is tuck folded between the tethers 194 and 196, to a position about three inches past the tethers in a direction toward the mouth portion 200 of the air bag.

Next, the entire body portion 140 of the air bag 90 is tuck folded inside the neck portion 130 of the air bag which protrudes from the housing 82. In this process, the lower portion 220 of the air bag 90 is packed or folded more tightly than the upper portion 222. Specifically, the lower portion 220 of the air bag 90 is folded into a relatively large number of smaller folded portions, while the upper portion 222 of the air bag is folded into a relatively small number of larger folded portions. The folded portions of the lower portion 220 of the air bag 90, because they are greater in number, are packed more tightly than are the folded portions of the upper portion 222 of the air bag. At the intermediate folding step illustrated schematically in FIG. 8, the folded portions of the lower portion 220 of the air bag 90, because they are smaller than the folded portions of the upper portion 222 of the air bag, protrude from the housing 82 by a smaller distance than the folded portions of the upper portion 222 of the air bag. In one air bag 90 constructed in accordance with the present invention, the folded portions of the lower portion 220 of the air bag protrude from the housing 82 by a distance of about 5.6 inches at this intermediate folding step, while the folded portions of the upper portion 222 protrude from the housing by a distance of about 8 inches.

When the air bag 90 is folded in this manner, the number of folded portions of the air bag is inversely proportional to the size of the folded portions. Since the tightness with which the folded portions are packed is directly proportional to the number of folded portions, then it can be said that the tightness with which the folded portions are packed is inversely proportional to the size of the folded portions. As a result, it can be said that the lower portion 220 of the one air bag 90 described above is packed more tightly than the upper portion 222 by a ratio of about 8 to about 5.6, or a ratio of about 10 to about 7.

Finally, as illustrated schematically in FIG. 9, the neck portion 130 and the body portion 140 of the air bag 90 are folded into the upper portion 100 of the housing 82. The assembled air bag module 80 is secured to the seat frame member 34 (FIGS. 3 and 4) in the seatback 22, at a location adjacent to the headrest 32. The forward edge portion 102 of the housing 82 faces outward at an angle β (FIG. 2) to the front-to-back axis 36 and upward at an angle α (FIG. 4) from the horizontal. Specifically, the module 80 is mounted on the seatback 22 so that when the seatback is reclined at an angle of 25° from the vertical, the air bag 90 deploys in a forward direction, as described below, with the first axis 142 extending (a) at an angle α of 65° upward from the horizontal and (b) at an angle β of 3° outward of the front-to-back axis 36.

In the event of a side impact to the vehicle 14 of a magnitude for which inflation of the air bag 90 is desired to help protect the vehicle occupant 52, the inflator 84 is actuated in a known manner and directs inflation fluid under pressure into the chamber 98 in the housing 82. The walls of the housing 82 direct the inflation fluid through the inflation fluid opening 202 in the mouth portion 200 of the air bag 90 and into the elongate neck portion 130 of the air bag. The inflation fluid flows through the neck portion 130 of the air bag 90 and thence into the body portion 140. The air bag 90 inflates from a folded, stored condition to an inflated condition as illustrated in FIGS. 1–4.

The elongate neck portion 130 of the air bag 90 inflates before the body portion 140, because the body portion is tucked and folded inside the neck portion. The neck portion 130 of the air bag 90 inflates adjacent to the occupant's neck and head. After the neck portion 130 of the air bag 90 inflates, the body portion 140 of the air bag inflates and billows out to a position between the occupant's head and the inner side surface 44 of the vehicle window 42, as seen in FIGS. 3 and 4.

Figure 10:
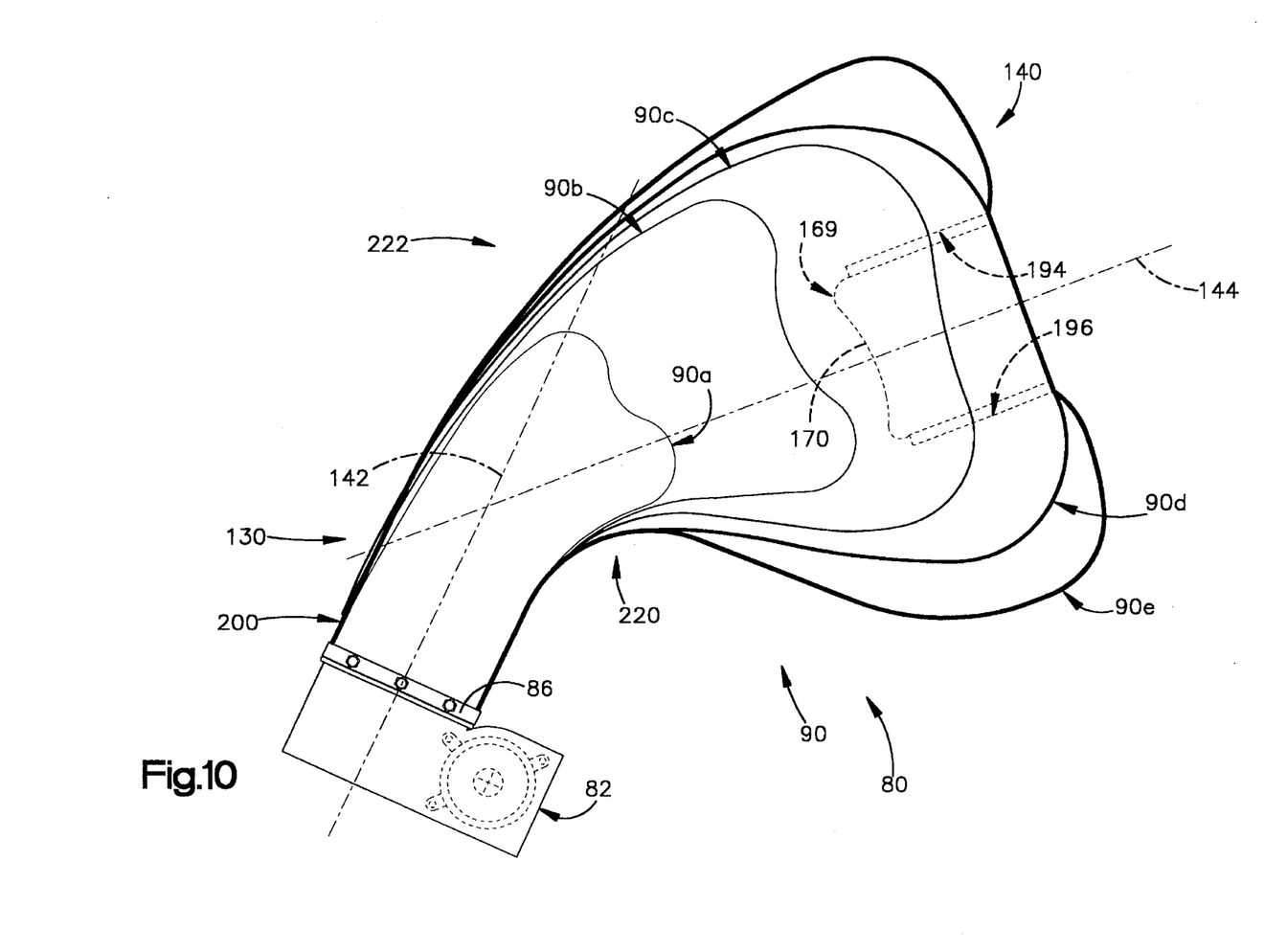
FIG. 10 is a schematic illustration of a series of partially inflated conditions of the air bag of FIG. 1.

FIG. 10 illustrates schematically several stages in inflation of the air bag 90. Specifically, five sequential inflated conditions of the air bag 90 are illustrated schematically in FIG. 10 and are designated 90a, 90b, 90c, 90d, and 90e. The condition 90a is a first partially inflated condition in which the neck portion 130 of the air bag 90 is substantially inflated. The condition 90e is a fifth or subsequent partially inflated condition in which the air bag is substantially in the condition shown in FIG. 7, with the end portion 169 of the air bag still being tuck folded tightly between the tethers 194 and 196. The second, third and fourth conditions 90b, 90c, and 90d, respectively, are sequential states of inflation or conditions of the air bag 90 intermediate in time between the conditions 90a and 90e.

During inflation of the air bag 90 as illustrated in FIG. 10, because the lower portion 220 of the air bag is folded more tightly than the upper portion 222, there is more friction (between the folded portions of the lower portion of the air bag) to overcome in unfolding of the lower portion of the air bag. This increased amount of friction results in a lower rate of deployment for the lower portion 220 of the air bag 90 than for the upper portion 222 of the air bag. This difference in the deployment rates causes the air bag 90 to deploy in a rainbow pattern, with the upper portion 222 of the air bag arching outward from the housing 82 and inflating in a curvilinear manner over the more slowly unfolding lower portion 220 of the air bag.

For example, when the air bag 90 is in the first partially inflated condition shown at 90a, the neck portion 130 of the air bag 90 is substantially inflated. This first stage of inflation takes place in a direction generally along the first axis 142. However, the body portion 140 of the air bag 90 subsequently inflates at least temporarily, in a direction different from the direction along the first axis 142. Specifically, the inflation of the body portion 140 of the air bag 90, from the condition shown at 90a to the condition shown at 90b, at least temporarily occurs in a direction generally along the second axis 144, rather than in the direction of the first axis 142.

This change in the direction of inflation of the air bag 90 is temporary, lasting for only about ten milliseconds. However, this temporary change in the direction of inflation of the air bag 90 occurs even though the body portion 140 of the air bag is not yet sufficiently inflated to tension the fabric material panels from which the body portion is made. That is, it is not merely the final inflated shape (as seen in FIG. 6) of the air bag 90 which causes the body portion 140 of the air bag to inflate through the condition shown at 90b. Instead, the lower rate of deployment for the lower portion 220 of the air bag 90 than for the upper portion 222 of the air bag, resulting from the asymmetric packing or folding discussed above, causes the still-folded body portion 140 of the air bag to inflate temporarily more in a forward direction (to the right as viewed in FIG. 10) than in an upward direction (upward as viewed in FIG. 10). This change in the trajectory of the body portion 140 of the air bag 90 can help to prevent the air bag from undesirably deploying upward into engagement with the headliner or roof of the vehicle.

The air bag 90 inflates between the head and neck of the occupant 52 of the vehicle 14, and the vehicle window 42 or B-pillar 46. The inflated air bag 90 is located between the occupant 52 and the shoulder belt portion 60 of the belt webbing 54 adjacent the D-ring 68. The air bag 90 extends between the seat 12 and the door 40 to help protect the occupant 52 of the seat from a forceful impact with the door. The inflated air bag 90 can also help protect the occupant 52 from an object intruding through the door 40 or window 42 into the passenger compartment of the vehicle 14.

The angles of deployment described above, that is, 65° upward from the horizontal and 3° outward of the front-to-back axis, are selected to enable the neck portion 130 and the body portion 140 of the air bag 90, when inflated, to lie adjacent to the head and neck of an upright seated occupant 52. The body portion 140 of the air bag 90, when inflated, is engageable by the head and neck of a forward leaning vehicle occupant 52.

Specifically, it is desirable that the air bag 90 inflate outward of the front-to-back axis 36 so as to avoid engaging the head of an out-of-position occupant 52 as the air bag inflates into a position adjacent to or past the occupant's head. The selected angle of 3° outward of the front-to-back axis 36 enables this desired inflation position while minimizing the possibility of the inflating air bag engaging and being caught on the vehicle door 40 or the seat belt 60.

It is also desirable that the air bag 90 inflate in a direction upward from the housing 82 so that the air bag can pass over the shoulder of the occupant 52 before inflating forward into a position adjacent to or past the occupant's head. If the air bag 90 inflates in a direction too far upward from the horizontal, however, the air bag might engage the headliner of the vehicle, which could affect the deployment of the air bag. The selected angle of 65° upward from the horizontal enables this desired upward inflation direction while minimizing the possibility of the inflating air bag 90 engaging the headliner of the vehicle.

From the above description of the invention, those skilled in the art will perceive improvements, changes and modifications in the invention. For example, the relative proportions of the neck portion 130 and the body portion 140 of the air bag 90, as well as the overall dimensions of the air bag, can be different from those of the illustrated air bag. Such improvements, changes and modifications within the skill of the art are intended to be covered by the appended claims.

Having described the invention, we claim:

1. A vehicle safety apparatus comprising:

a seat for supporting an occupant of the vehicle in a seated position with the occupant's head disposed adjacent to a side structure of the vehicle, said seat including a seat bottom portion and a seatback;

a housing;

an inflatable vehicle occupant protection device in said housing for, when inflated, helping to protect the occupant of the vehicle, said inflatable device having a body portion and an elongate tubular neck portion which lie adjacent to the occupant's head and neck when inflated for engagement by the occupant's head and neck;

an inflator for directing inflation fluid into said inflatable device to inflate said inflatable device;

means for sensing a side impact to the vehicle of a magnitude for which inflation of said inflatable device is desired to help protect the vehicle occupant and for actuating said inflator to inflate said inflatable device in response to sensing said side impact to the vehicle; and support means for supporting said housing on said seatback for inflation of said inflatable device above the vehicle occupant's shoulder and between the vehicle occupant's head and the vehicle side structure;

said neck portion of said inflatable device when inflated extending from said housing and having a first axis extending through said neck portion, said body portion of said inflatable device when inflated extending from said neck portion and having a second axis extending through said body portion at an angle to said first axis;

said axis of said neck portion of said inflatable device extending forward at an angle of about 65° above the horizontal and at an angle of about 3° outward from a front-to-back axis of the vehicle when said inflatable device is inflated and said seatback is reclined at an angle of about 25° from the vertical.

2. An apparatus as set forth in claim 1 wherein said first axis of said neck portion of said inflatable device extends at an angle of from about 40° to about 60° to said second axis of said body portion of said inflatable device.

3. An apparatus as set forth in claim 1 wherein said axis of said neck portion of said inflatable device extends at an angle of about 45° to said axis of said body portion of said inflatable device.

4. An apparatus as set forth in claim 1 wherein said neck portion of said inflatable device curves down and away from said body portion when said inflatable device is in the inflated condition thereby providing said inflatable device with a generally comma-shaped configuration when inflated.

5. An apparatus as set forth in claim 1 wherein said neck portion of said inflatable device when inflated has a relatively small height as measured in a direction perpendicular to said first axis and said body portion of said inflatable device when inflated has a relatively large height as measured in a direction perpendicular to said second axis.

6. An apparatus as set forth in claim 5 wherein the height of said body portion of said inflatable device is in the range of from about twice the height of said neck portion of said inflatable device to about four times the height of said neck portion of said inflatable device.

7. A vehicle safety apparatus as set forth in claim 1 wherein said seatback of said vehicle seat includes a headrest, said housing being supported on a side portion of said seatback at a location below said headrest.

8. A vehicle safety apparatus as set forth in claim 1 wherein said inflatable device has a lower portion which is disposed adjacent to the vehicle occupant's shoulder when inflated and an upper portion which is disposed farther from the vehicle occupant's shoulder than said lower portion when inflated;

said lower portion of said inflatable device when in the deflated condition being packed more tightly than said upper portion of said inflatable device thereby to promote unfolding and deployment of said upper portion of said inflatable device more quickly than unfolding and deployment of said lower portion of said inflatable device.

9. A vehicle safety apparatus comprising:

a seat for supporting an occupant of the vehicle in a seated position with the occupant's head disposed adjacent to a side structure of the vehicle, said seat including a seat bottom portion and a seatback;

a housing;

an inflatable vehicle occupant protection device for, when inflated, helping to protect the occupant of the vehicle, said inflatable device having a deflated condition folded and packed in said housing and having a body portion and an elongate tubular neck portion which lie adjacent to the occupant's head and neck when inflated for engagement by the occupant's head and neck;

said inflatable device having a lower portion which is disposed adjacent to the vehicle occupant's shoulder when inflated and an upper portion which is disposed farther from the vehicle occupant's shoulder than said lower portion when inflated;

an inflator for directing inflation fluid into said inflatable device to inflate said inflatable device from the deflated condition to the inflated condition;

means for sensing a side impact to the vehicle of a magnitude for which inflation of said inflatable device is desired to help protect the vehicle occupant and for actuating said inflator to inflate said inflatable device in response to sensing said side impact to the vehicle; and support means for supporting said housing on said seatback for inflation of said inflatable device above the vehicle occupant's shoulder and between the vehicle occupant's head and the vehicle side structure;

said lower portion of said inflatable device when in the deflated condition being packed more tightly than said upper portion of said inflatable device thereby to promote unfolding and deployment of said upper portion of said inflatable device more quickly than unfolding and deployment of said lower portion of said inflatable device.

10. A vehicle safety apparatus as set forth in claim 9 wherein said body portion of said inflatable device is folded inside said elongate neck portion of said inflatable device and said neck portion and said body portion are folded inside said housing when said inflatable device is in the deflated condition.

11. A vehicle safety apparatus as set forth in claim 9 wherein said lower portion of said inflatable device when in the deflated condition is tuck folded more tightly than said upper portion of said inflatable device by a ratio of about 10 to 7 to promote deployment of said air bag in a curvilinear manner.

12. A vehicle safety apparatus as set forth in claim 9 wherein said neck portion of said inflatable device when inflated extends from said housing and has a first axis extending through said neck portion, said body portion of said inflatable device when inflated extending from said neck portion and having a second axis extending through said body portion at an angle to said first axis;

said axis of said neck portion of said inflatable device extending forward at an angle of about 65° above the horizontal and at an angle of about 3° outward from a front-to-back axis of the vehicle when said inflatable device is inflated and said seatback is reclined at an angle of about 25° from the vertical.

13. An apparatus as set forth in claim 12 wherein said first axis of said neck portion of said inflatable device extends at an angle of from about 30° to about 70° to said second axis of said body portion of said inflatable device.

14. An apparatus as set forth in claim 12 wherein said axis of said neck portion of said inflatable device extends at an angle of about 50° to said axis of said body portion of said inflatable device.

15. An apparatus as set forth in claim 9 wherein said neck portion of said inflatable device curves down and away from said body portion when said inflatable device is in the inflated condition thereby providing said inflatable device with a generally comma-shaped configuration when inflated.

16. An apparatus as set forth in claim 9 wherein said inflatable device, said housing, and said inflator are stored in said seat back at a location below a head rest portion of said seat back.

17. An apparatus as set forth in claim 11 wherein said lower portion of said inflatable device deploys more quickly than said upper portion and into a curvilinear shape so as to minimize contact and interference with the head and neck of an out of position vehicle occupant and with seat belt webbing used for restraining the occupant.

* * * * *